United States Patent
McEwan

(10) Patent No.: US 7,345,623 B2
(45) Date of Patent: Mar. 18, 2008

(54) REFLECTION FREE LAUNCHER FOR ELECTROMAGNETIC GUIDE WIRE

(75) Inventor: Thomas Edward McEwan, Las Vegas, NV (US)

(73) Assignee: M<sup>c</sup>Ewan Technologies, LLC, Las Vegas, NV (US)

( * ) Notice: Subject to any disclaimer, the term of this patent is extended or adjusted under 35 U.S.C. 154(b) by 248 days.

(21) Appl. No.: 11/362,458

(22) Filed: Feb. 24, 2006

(65) Prior Publication Data

US 2007/0200749 A1   Aug. 30, 2007

(51) Int. Cl.
*G01S 13/08* (2006.01)
*G01F 23/284* (2006.01)

(52) U.S. Cl. ............... 342/124; 342/175; 73/290 R

(58) Field of Classification Search .......... 342/17–175; 73/290 R, 290 V, 304 R; 333/32–35
See application file for complete search history.

(56) References Cited

U.S. PATENT DOCUMENTS

| | | | |
|---|---|---|---|
| 2,685,068 A | 7/1954 | Goubau | |
| 3,683,299 A | 8/1972 | Vzyatyshev et al. | |
| 3,995,212 A | 11/1976 | Ross | |
| 5,609,059 A | 3/1997 | McEwan | |
| 6,019,007 A | 2/2000 | Grieger et al. | |
| 6,229,476 B1 | 5/2001 | Lütke et al. | |
| 6,295,018 B1 * | 9/2001 | Diede et al. ............. | 342/124 |
| 6,452,467 B1 | 9/2002 | McEwan | |
| 6,619,117 B1 | 9/2003 | Reimelt | |
| 6,644,114 B1 * | 11/2003 | McEwan .................. | 73/290 R |
| 6,690,320 B2 * | 2/2004 | Benway et al. ........... | 342/124 |
| 6,782,328 B2 * | 8/2004 | Lovegren et al. ......... | 702/50 |

\* cited by examiner

*Primary Examiner*—Isam Alsomiri

(57) ABSTRACT

Guided wave radar (GWR) pulses are launched onto an electromagnetic guide wire using a compact launcher that includes an impedance matching element. The impedance matching element produces reflections that cancel launcher reflections. Short range echoes can be accurately detected after impedance matching. GWR operation in small tanks and in tanks containing low dielectric constant materials, such as propane, can be enhanced with the compact impedance-matched launcher.

11 Claims, 4 Drawing Sheets

US 7,345,623 B2

REFLECTION FREE LAUNCHER FOR ELECTROMAGNETIC GUIDE WIRE

BACKGROUND OF THE INVENTION

1. Field of the Invention

The present invention relates to a pulse launcher for single wire transmission lines adapted to pulsed electromagnetic sensors, and more particularly to fluid and material level sensors employing Guided Wave Radar (GWR) reflectometers. These sensors can be used for determining or controlling the fill-level of a tank, vat, irrigation ditch, silo, pile, or conveyor.

2. Description of Related Art

Propagation of electromagnetic waves along a single wire transmission line, also known as an electromagnetic guide, or guide wire, was first theorized by A. Sommerfeld in 1899. Sommerfeld's transmission line relies on a resistively lossy conductor to slow the wave slightly. Slower propagation, on the order of 99% of the speed of light, is required to retain the propagating fields proximal to the guide wire. In 1954, G. Goubau disclosed in U.S. Pat. No. 2,685,068, "Surface Wave Transmission Line," another method to slow propagation without requiring a lossy conductor—a line coated with a dielectric material such as plastic. Goubau showed, contrary to conventional notions that guide wires are very leaky, that his coated guide wire exhibited the lowest loss of any transmission line geometry, including waveguides. However, guide wires, or equivalently, larger diameter stainless steel rod-like probes are rarely coated in modern guided wave radar (GWR) applications such as tank level sensing. Far more often, Sommerfeld's line can be found in commercial practice, and its propagation losses are often minimal, particularly when compared to propagation in free space over the same distance.

Guided wave radar is a form of time domain reflectometry (TDR). A pulse is propagated along an electromagnetic guide and range to an object is determined from the delay time of its echo pulse. The first GWR was disclosed in 1976 in U.S. Pat. No. 3,995,212, "Apparatus and Method for Sensing a Liquid with a Single Wire Transmission Line," to G. Ross. Both Goubau and Ross used a horn as a transition device between a coaxial feed cable and a single wire transmission line. The horn serves two purposes: (1) conversion of electric field geometry and (2) impedance matching. A horn with a wire passing through it can be considered to be a tapered coaxial line with a smoothly changing characteristic impedance. The aperture of a horn launcher does not directly affect its gain as one might expect with a conventional free-space horn. The reason for aperture independence is the guide wire already "beams" energy from the horn—beam shaping by the horn is not required. Consequently, the primary parameter of interest in launcher horn design is impedance matching. The longer the horn and the more its mouth flares back like a tuba horn, the better the impedance matching. The horn acts as a distributed impedance matching transformer with a low impedance at its neck and a high impedance at its mouth.

While the horn is simple, it is often too large for many practical applications, e.g., tank fill level sensing, where small openings in the tank are often the only available apertures through which a GWR probe can be inserted. Another limitation to the horn is it often casts reflections from its aperture since the transition from the coaxial geometry at the aperture to the open geometry of the guide wire introduces an impedance discontinuity. U.S. Pat. No. 6,452,467, "Material Level Sensor Having a Wire-Horn Launcher," to the present inventor discloses an open wire or leaf arrangement for the shape of a horn that provides a much smoother impedance transition to the guide wire. However, it too requires a larger physical dimension that can be tolerated in some applications.

A flat plate launcher was disclosed in U.S. Pat. No. 5,609,059, "Electronic Multi-Purpose Material Level Sensor," 1997, to the present inventor. A flat or slightly curved launcher plate has the considerable advantage that the plate can be formed by the tank wall, so only a small tank aperture is needed through which a guide wire or rod-like probe can be inserted. This feature contributed to wide commercial success of the flat plate launcher of the '059 patent.

The plate launcher exhibits a sharp impedance discontinuity between a coaxial feed line impedance of, for example, 50 ohms and a guide wire impedance of, for example, 500 ohms. This discontinuity introduces a large reflection at the coax/launcher interface. The '059 patent discloses an apparatus that detects this reflection, termed a fiducial pulse, and uses it as a start-of-measurement reference. Measuring from the fiducial pulse has at least two key advantages: (1) time delays in the transceiver and the feed line to the launcher are not included in the range measurement, and (2) the measurement is referenced to the top of the tank (where the guide wire is often inserted) as is common in industrial practice with other sensor technologies. Unfortunately, the large reflection from the launcher plate obscures desired short-range echoes. Thus, it is difficult to sense a full condition in a tank, or to accurately measure tanks levels when nearly full. In commercial parlance, there is a "dead space" that is often specified on commercial GWR level sensors. Some commercial GWR devices digitally store the launcher reflection and subtract it from subsequent readings. This technique for removing launcher reflections in software is effective only if the launcher conditions remain the same, e.g., assuming the GWR apparatus is not mounted on a tank having different characteristics than those during digital storage of the launcher reflection.

A launcher is needed that combines the best features of both the horn and the plate with none of the drawbacks. A launcher is needed that casts no reflections so short range echoes can easily be measured. In addition, an impedance-matched low reflection launcher is needed that is compact in size for insertion through small apertures.

SUMMARY OF THE INVENTION

The present invention provides a reflection free electromagnetic guide wire launcher for GWR sensors, which can include, but is not limited to, A launcher for launching and receiving pulses on an electromagnetic guide wire, including:

a transition device for converting from a dual conductor transmission line having a first impedance to a single conductor electromagnetic guide wire having a second impedance; and an impedance matching element for matching the first impedance to the second impedance by producing a reflection having substantially equal magnitude and opposite phase to a reflection produced by the transition device.

The dual conductor transmission line can be at least one of a coaxial line, a microstrip line, a coplanar waveguide, or a balanced line. The impedance matching element can be a reflector attached to the guide wire within one wavelength distance from the dual conductor transmission line. The impedance matching element can also be a guide wire of larger diameter than a wire connecting it to the dual conductor transmission line. The impedance matching element can also be a resonant stub attached to the transition device within one wavelength distance from the dual conductor transmission line. Further, the impedance matching element can include a second dual conductor transmission line having two ends, wherein a first end is connected to the first dual conductor transmission line, and a second end is connected to a network having an predetermined impedance that produces a reflection of substantially equal magnitude and opposite phase to a reflection produced by the transition device. The transition device can be a plate, a cylinder or a horn. The GWR pulses can consist of packets including at least two RF cycles.

The present invention provides also provides a procedure for launching an electromagnetic pulse onto a guide wire, including:
   providing a transition device for converting from a dual conductor transmission line to a single conductor electromagnetic guide wire, wherein the transition device produces a transition reflection,
   producing a matching refection of substantially equal magnitude and opposite phase to the transition reflection; and
   adding the matching reflection to the transition reflection to cancel the transition reflection.

The present invention also provides a guided wave radar sensor, including:
   a radar transceiver for producing a transmit burst, wherein the burst includes two or more radio frequency cycles and for receiving echoes of the transmit burst,
   a dual conductor transmission line having a first end and a second end, wherein the first end is connected to the radar transceiver,
   a single wire transmission line for conducting the transmit burst to a reflecting object and for conducting echoes from the reflecting object back to the transceiver,
   a transition device for coupling between the second end of the dual conductor transmission line and the single wire transmission line, and for producing a transition reflection; and
   a reflective matching element coupled to the single wire transmission line for producing a reflection to cancel the transition element reflection.

The transition device can be a plate, a cylinder or a horn.

One object of the present invention is to provide an impedance matched launcher that casts no reflections so short range echoes can easily be measured. Another object of the present invention is to provide an impedance matched launcher that is also compact in size for insertion through small apertures.

DETAILED DESCRIPTION OF THE INVENTION

A detailed description of the present invention is provided below with reference to the figures. While illustrative component values and circuit parameters are given, other embodiments can be constructed with other component values and circuit parameters. All U.S. Patents and copending U.S. applications cited herein are herein incorporated by reference.

General Description

The present invention overcomes the limitations of the various prior guided wave radar launchers by including an impedance matching element based on reflection techniques. In contrast, prior impedance matching techniques include (1) absorptive matching using resistors, as seen in the above-cited '059 patent to McEwan, and (2) distributed transformer matching using a horn or blades, as seen in the above-cited Goubau, Ross and McEwan patents. Reflection matching is based on creating a matching reflection of equal magnitude and opposite phase to cancel the unwanted reflection produced by the launcher impedance discontinuity, i.e., the launcher impedance mismatch. Cancellation occurs when the launcher reflection and the matching reflection algebraically add. The addition can occur on the feed cable connected to the launcher. Reflection matching can include, but is not limited to, (1) a distributed inductive-capacitive (LC) network on the guide wire or on the feed line, (2) a tuned stub coupled to the guide wire, or (3) a complimentary reflection network. Reflection matching techniques are readily implemented using wideband GWR pulses, e.g., bursts (i.e., packets) consisting of two or more RF cycles as indicated by waveform 24 in FIG. 1.

Specific Description

Figure 1:
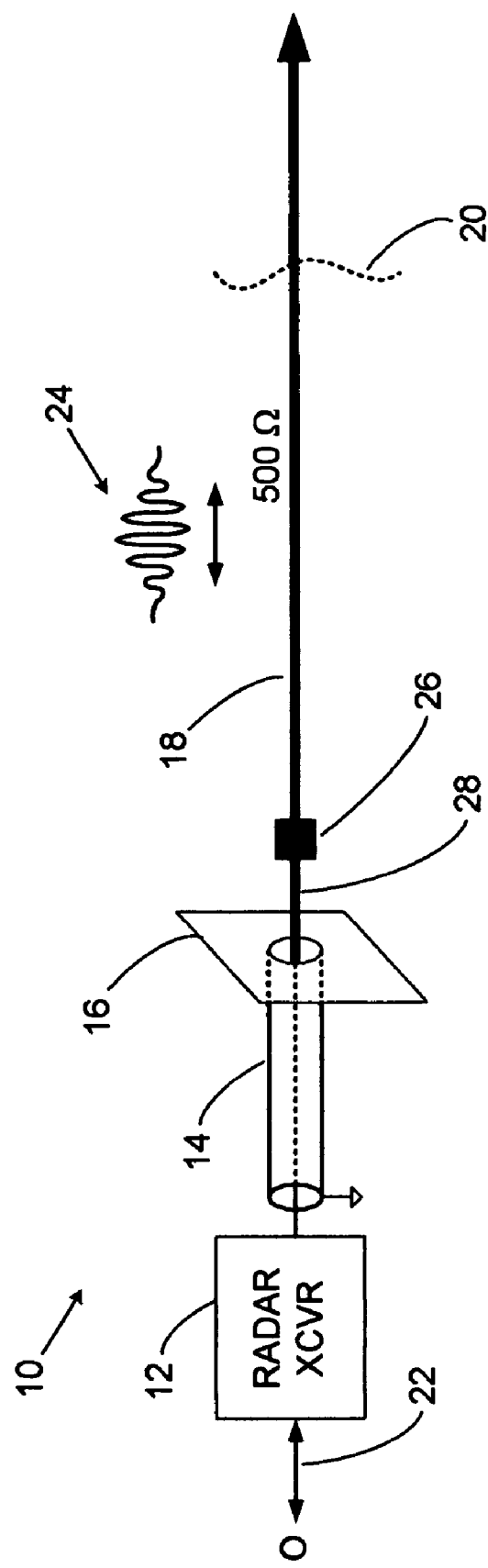
FIG. 1 depicts a GWR including a launcher with a capacitive matching element.

Turning now to the drawings, FIG. 1 shows a general configuration of a GWR 10 of the present invention. A radar transceiver 12 couples transmit pulses onto a coaxial transmission line 14. Line 14 is a feed line shown as coaxial line, but it can be other forms of transmission line having two conductors. Example two-conductor transmission lines include, but are not limited to, coax, microstrip, coplanar waveguide, and balanced line. One of the conductors is often grounded. The shield or ground conductor of coax 14 is connected to launcher 16. The center conductor of coax 14 is connected to guide wire 18. Launcher 16 is conductive and can be formed, for example, in a rectangular or round shape, it can be curved, or it can be part of a tank wall or top. It provides an abrupt transition from coax 14 to guide wire 18 geometry. The transmission line impedance is often 50 ohms and the guide wire impedance is about 500 ohms. Accordingly, there is a large impedance mismatch between the coax and the guide wire that produces a large launcher reflection back to the radar transceiver. Coax 14 can be eliminated and radar transceiver 12 can be connected directly to launcher 16 without departing from the scope of the invention. If coax 14 is not present then transceiver 12 can be connected to launcher 16 via two conductors with one being ground or else floating in the case of a balanced configuration. The other conductor can be connected to guide wire 18.

In a tank fill-level application, for example, a guide wire 18 is partially immersed in a liquid or material having a surface 20 that reflects an echo back to the transceiver. The transceiver measures echo delay to determine fill level. If surface 20 is close to the launcher, the echo produced by surface 20 merges with the reflection from the launcher and distorts the range reading.

A small matching element 26 can be attached to the guide wire to reflect part of the transmitted pulse on the guide wire back to the coax. This reflection can be of equal magnitude and opposite in phase to the launcher reflection so the two reflections cancel. Consequently, little or no launcher reflection propagates back to the radar transceiver. This is the same result, insofar as the launcher reflection is concerned, as would be obtained if the launcher were matched using conventional resistive or transformer techniques. Benefits to reflection matching include but are not limited to (1) extreme simplicity, (2) low cost, (3) ruggedness, and (4) compactness.

Matching element 26 is a reflecting element that is beneficially located within a fraction of a wavelength of the launcher. The shape of element 26 can be flat and rectangular, or flat and round, or spherical, or other shapes. Element 26 can also be considered to be a capacitive lumped element C and guide wire segment 28 can be considered to be a lumped inductive element L. Together they form an LC matching network.

A matching network changes an impedance value connected to its input, e.g., 50 ohms, to match, i.e., equal, an impedance value connected to its output, e.g., 500 ohms. When impedances are matched on transmission lines, there are no impedance discontinuities and thus no reflections along the line.

Radar transceiver 12 transmits pulse bursts that can include two or more RF cycles; for example, six cycles at 6 GHz. At 6 GHz center frequency, example parameters are: launcher plate=40×40×0.25 mm brass, guide wire=1 mm diameter steel, segment 28=2 mm long, element 26=3×3× 0.25 mm brass, asymmetrically mounted on the guide wire (its top edge is aligned with the top edge of the guide wire). The launcher plate can also be less than 2 cm in diameter for 6 GHz GWR pulses. Operation with RF bursts can allow narrowband filtering in radar transceiver 12, which better filters radar clutter than can be realized with UWB impulses. Low clutter can allow detection of low dielectric constant materials. Also, the shape of RF burst 24 is less affected by dispersion often found in some probe geometries.

Radar transceiver 12 measures range to a reflecting object, e.g., surface 20, and outputs its measurements on line 22, often to a display, a processor, a controller, or a combination thereof. Line 22 can also input control signals and power to the transceiver, often via a two-wire industrial loop.

Figure 2:
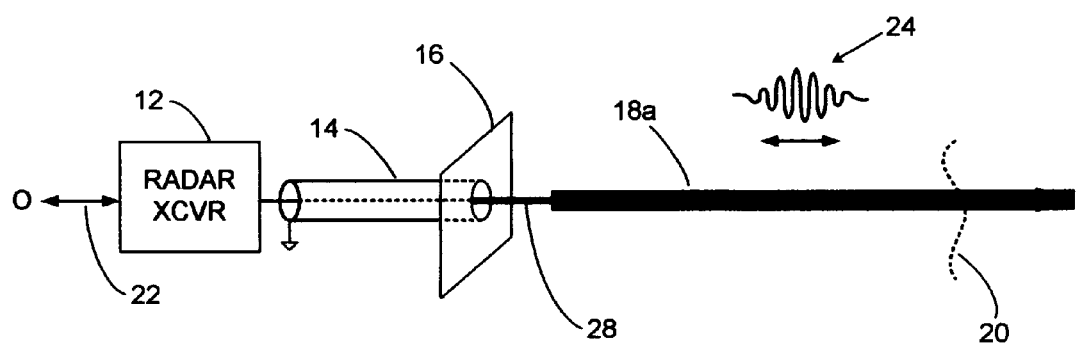
FIG. 2 depicts a GWR including a launcher with a large diameter probe.

FIG. 2 depicts a reflection matching technique based on a large diameter guide wire, i.e., rod-like probe 18a. The term "guide wire" can also include, for example, other conductors than thin wires, e.g., thick metallic rods, dielectric rods, multi-strand cable, hollow pipe, angle iron, snaked wires and rods, and structural elements. Other elements of FIG. 2 are similar to those in FIG. 1 except rod 18a replaces matching element 26. Segment 28, can be a small diameter conductor that connects the center conductor of coax 14 to the guide wire. The length of segment 28 can be adjusted to cancel the reflection from launcher 16 using a reflection from rod 18a. The diameters of segment 28 and probe 18a can be adjusted, along with the length of segment 28, to produce a substantially complete cancellation of the launcher reflection.

Figure 3:
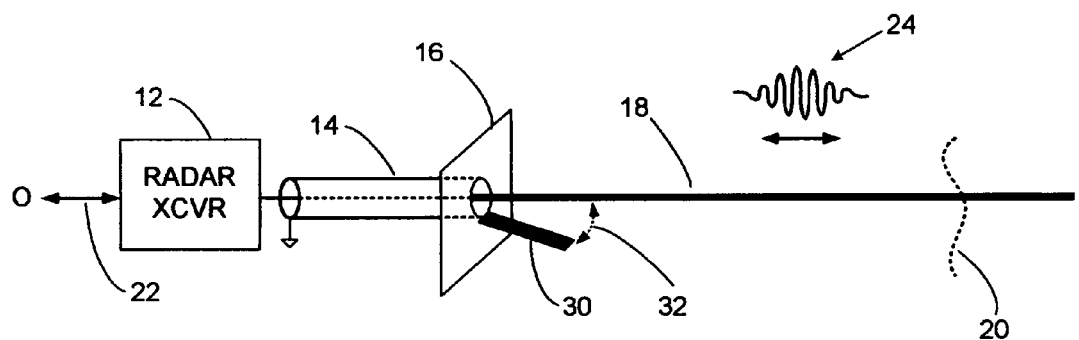
FIG. 3 depicts a GWR including a launcher with a stub matching element.

FIG. 3 shows another reflection matching technique using a resonant stub 30. The length and width of stub 30 along with its mounting angle 32 can be adjusted to produce a nearly complete cancellation of the launcher reflection. The dimensions of stub 30 and its angle 32 are too small to be considered a partial horn. The length of stub 30 can be optimized for the operating frequency of RF pulse 24. The optimal length of the stub is also dependent on angle 32. The stub is substantially smaller and simpler than a horn.

Figure 4:
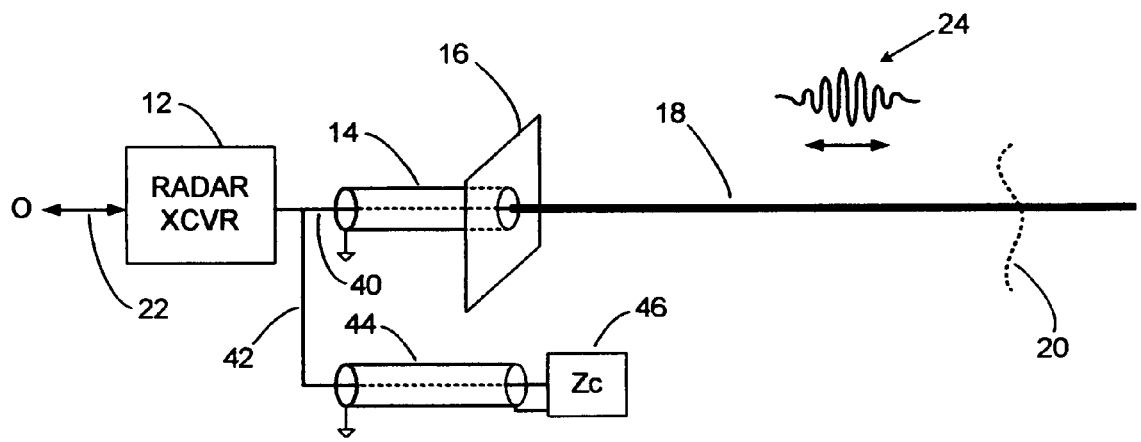
FIG. 4 depicts a GWR including a launcher with a complimentary impedance matching element.

FIG. 4 depicts a reflection matching technique using a complimentary impedance Zc. Radar transceiver 12 is coupled to coax 14 via line 40 and to coax 44 via line 42. Coax 44 is connected to a network 46 having an impedance that is a compliment to that of the impedance at coax 14 to launcher 16 junction. The impedance of cables 14 and 44 can be 50 ohms. The impedance of guide wire 18 can be 500 ohms. The interface between coax 14 and launcher 16 can cast a reflection $\Gamma$ of $\Gamma=(Zg-Zo)/(Zg+Zo)=(500-50)/(500+50)=0.82$, where Zg=guide wire 18 impedance and Zo=cable 14 impedance. If the impedance of the complimentary network Zc=5 ohms, its reflection is $G=(5-50)/(5+50)=-0.82$. This reflection is equal in magnitude and opposite in phase to the launcher reflection and thus the two reflections cancel at the junction of lines 40 and 42, provided both coaxes have the same delay. Accordingly, launcher 16 appears matched to coax 14 since there are no launcher reflections. This broadband matching technique can work with RF burst 24 or with an ultra-wideband impulse. While the length of coaxes 14 and 44 usually must be electrically equal, cable 44 may have a differing length and impedance such that when combined with impedance Zc a reflection cancellation occurs at the junction of lines 40 and 42. The example given here is an approximation since the launcher impedance does not change abruptly from 50 to 500 ohms. Rather, the impedance tapers from 50 to 500 ohms over several centimeters or more. Accordingly, network 46 can require a combination of reactive and resistive elements. A complimentary impedance network can be defined as a network that produces a canceling reflection. FIG. 4 shows an example connection of coax 14 and coax 44 via lines 40 and 42. However, the two coaxes, or other transmission lines, can also be connected at, for example, the junction of launcher 16. They can also be connected indirectly through, for example, a resistive network, a transformer or other combining circuits.

Figure 5:
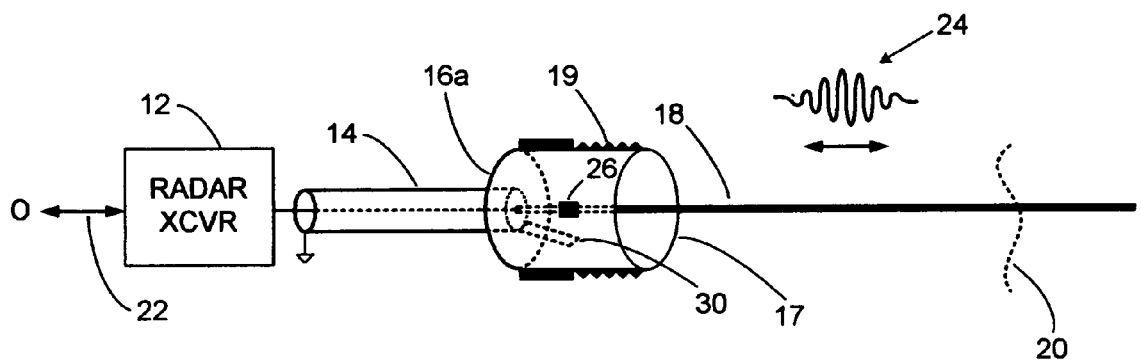
FIG. 5 depicts a GWR including a cylindrical launcher.

FIG. 5 illustrates a cylindrical launcher including reflection matching. Coax 14 couples radar transceiver 12 to a launcher plate 16a which forms a closed end of a launching cylinder 17. Guide wire 18 and matching elements 26 and 30 are as described previously. Either matching element 26 or element 30 can be used, or both in combination. More than one of each can also be used, particularly to compensate reflections from the mouth of cylinder 17. Matching element 30 can also be an adjustment screw extending from the side of cylinder 17 or plate 16a. Also, a larger diameter guide 18a can be used as shown in FIG. 2 with reflection matching as described with respect to FIG. 2. A sleeve or cylinder 17, which can include pipe threads 19, can be attached to launcher plate 16a with little effect on launching efficiency or reflections at launcher plate 16a. A threaded launcher consisting of elements 16a, 17 and 19 is preferred in tank level sensing because it can often be conveniently threaded into an aperture on the top of the tank, including both metallic and dielectric tanks. Example parameters for sleeve 17 for a 6 GHz GWR employing pulses 24 are: 3 cm long, 1.5 cm diameter, 1 mm thick brass. Other parameters are as described with respect to FIG. 1. Cylinder 17 may be filled with a dielectric. An adjustment screw or a tab can extend from the wall of cylinder 17 or from plate 16*a* into the cylinder for fine tuning the matching reflection.

The cylindrical launcher of FIG. 5 can also be considered to be an embodiment of a horn launcher, since by analogy, some horn antennas can have a cylindrical shape. Cylinder 17 is an exemplary shape; it may also be rectangular conical, triangular, U-shaped or other shapes that fully or partially surround guide 18.

Figure 6A:
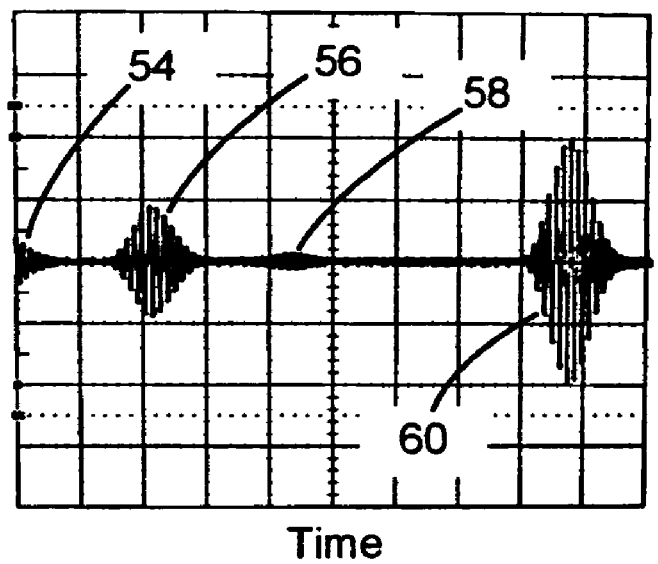
FIG. 6*a* is an oscillogram of a GWR showing a launcher reflection (PRIOR ART).

FIG. 6*a* (PRIOR ART) is an oscillogram showing reflections for a 6 GHz GWR similar to that shown in FIG. 1 minus matching element 26. Four pulses can be seen from left to right: a portion of the transmit signal 54, launcher reflection 56, pulse rattle 58, and surface, or echo, reflection 60 from a 4×4 cm metal reflector at about 1.5-meters range from the launcher plate along guide wire 18. As the metal reflector is moved closer to the launcher plate, its reflection 60 moves to the left and eventually collides with launcher reflection 56. By "collides," it should be understood that reflections 56 and 60 sum algebraically. Depending on their phase, which varies with range, they can add or subtract so their amplitude and envelope shape varies substantially and can even cancel completely, leading to loss of echo detection altogether. Accurate ranging is impossible and reliable echo detection becomes questionable due to launcher reflection 56.

Pulse rattle 58 can produce unwanted effects similar to those caused by launcher reflection 56 since it lies in the active measurement range of the reflectometer. The pulse rattle arises from launcher reflection 56 propagating back to transceiver 12, where a small portion of it reflects back towards the guide wire and appears time delayed and positioned as seen at the location of pulse 58. Pulse 58 is fairly well-controlled in this example, but depending on the quality of radar transceiver 12, stronger and more deleterious pulse rattles can often occur. Pulse rattles can interfere with GWR operation, particularly when sensing low dielectric materials, such as propane, which cast reflections that can be smaller than the pulse rattle. Pulse rattles can be overcome by the present invention.

Figure 6B:
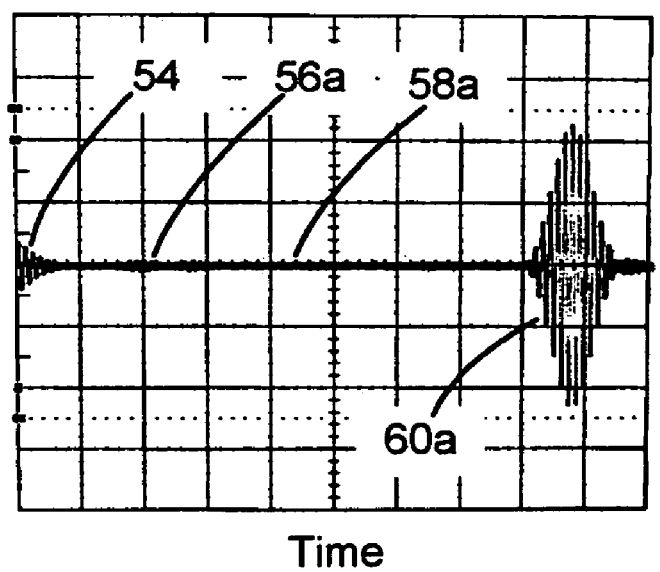
FIG. 6*b* is an oscillogram of the GWR of FIG. 1 showing a greatly attenuated launcher reflection.

FIG. 6*b* is an oscillogram taken from a bench test using exactly the same hardware as used in FIG. 6*a* but with matching element 26 added. The impact of matching element 26 on launcher reflection 56 is dramatic: it is essentially gone, or at least reduced to a barely visible pulse 56*a*. This implies a substantially perfect impedance match to the guide wire. Also, beneficially, rattle pulse 58*a* is substantially non-existent since its root cause, pulse 56*a*, is substantially gone. Another benefit from matching element 26: echo pulse 60*a* is stronger than echo pulse 60. Tests indicate that the amplitude of echo pulse 60*a* is the same as that obtained with a large horn of the prior art. An excellent pulse launch can be obtained using either a large prior art horn or a much more desirable flat plate with matching element 26 of FIG. 1. The combination of plate launcher 16 and matching element 26 provides lower launcher reflections than a horn while being implemented in a more compact embodiment.

Radar transceiver 12 can employ a variable gain amplifier, or VGA, that increases receive gain as a function of target range. Accordingly, the observed relative amplitudes of pulses 56 and 60 are skewed by the VGA. Without a VGA, pulse 56 can be stronger than pulse 60. That is, without reflection matching, the unwanted launcher reflection 56 can be stronger than the desired echo reflection 60 and can completely swamp it out, making short range measurements nearly impossible.

Reflection impedance matching as described herein can be used with a GWR to sense linear displacement along guide wires in machines and cylinders. GWR operation in small tanks and in tanks containing low dielectric constant materials, such as propane, is enhanced by reflection impedance matching.

The reflection matching configurations disclosed herein, e.g., as shown in FIGS. 1-5 are examples. Other configurations can be implemented without departing from the scope of the invention. For example, matching element 26 casts reflections from the guide wire 18 side of launcher 16. A comparable reflecting element could be located on the coax 14 side of launcher 16 to produce a canceling reflection. Changes and modifications in the specifically described embodiments can be carried out without departing from the scope of the invention which is intended to be limited only by the scope of the appended claims.

What is claimed is:

1. A launcher for launching pulses onto an electromagnetic guide wire, comprising:
    a transition device for converting from a dual conductor transmission line having a first impedance to a single conductor electromagnetic guide wire having a second impedance; and
    an impedance matching element for matching the first impedance to the second impedance by producing a reflection having substantially equal magnitude and opposite phase to a reflection produced by the transition device.

2. The launcher of claim 1 wherein the dual conductor transmission line is at least one of a coaxial line, a microstrip line, a coplanar waveguide, or a balanced line.

3. The launcher of either of claims 1 or 2 wherein the impedance matching element is a reflector attached to the guide wire within one wavelength distance from the dual conductor transmission line.

4. The launcher of either of claims 1 or 2 wherein the impedance matching element is a guide wire of larger diameter than a wire connecting the guide wire to the dual conductor transmission line.

5. The launcher of either of claims 1 or 2 wherein the impedance matching element is a stub attached to the transition device within one wavelength distance from the dual conductor transmission line.

6. The launcher of either of claims 1 or 2 wherein the impedance matching element includes a second dual conductor transmission line having a first end connected to the first dual conductor transmission line, and a second end connected to a network having a predetermined impedance that produces a reflection of substantially equal magnitude and opposite phase to a reflection produced by the transition device.

7. The launcher of claim 1 wherein the transition device is one of a plate, a cylinder or a horn.

8. The launcher of claim 1 further comprising launching and receiving pulses comprising packets of at least two RF cycles.

9. A method for launching an electromagnetic pulse onto a guide wire, comprising:
    providing a transition device for converting from a dual conductor transmission line to a single conductor electromagnetic guide wire, wherein the transition device produces a transition reflection,
    producing a matching refection of substantially equal magnitude and opposite phase to the transition reflection; and adding the matching reflection to the transition reflection to cancel the transition reflection.

10. A guided wave radar sensor, comprising:
a radar transceiver for producing a transmit burst, wherein the burst comprises two or more radio frequency cycles, and for receiving echoes of the transmit burst;
a dual conductor transmission line having a first end and a second end, wherein the first end is connected to the radar transceiver;
a single wire transmission line for conducting the transmit burst to a reflecting object and for conducting echoes from the reflecting object back to the transceiver;
a transition device for coupling the second end of the dual conductor transmission line to the single wire transmission line, and for producing a transition reflection; and
a reflective matching element coupled to the single wire transmission line for producing a matching reflection to cancel the transition reflection.

11. The guided wave radar sensor of claim 10 wherein the transition device is one of a plate, a cylinder or a horn.

* * * * *